United States Patent
Madiwale

(10) Patent No.: US 9,960,669 B2
(45) Date of Patent: May 1, 2018

(54) HYBRID SOFT-START FOR ISOLATED CONVERTER

(71) Applicant: Analog Devices, Inc., Norwood, MA (US)

(72) Inventor: Subodh Prakash Madiwale, San Jose, CA (US)

(73) Assignee: Analog Devices, Inc., Norwood, MA (US)

( * ) Notice: Subject to any disclaimer, the term of this patent is extended or adjusted under 35 U.S.C. 154(b) by 0 days. days.

(21) Appl. No.: 15/075,905

(22) Filed: Mar. 21, 2016

(65) Prior Publication Data

US 2017/0271977 A1 Sep. 21, 2017

(51) Int. Cl.
*H02M 3/335* (2006.01)
*H02M 1/36* (2007.01)

(52) U.S. Cl.
CPC .......... *H02M 1/36* (2013.01); *H02M 3/33507* (2013.01)

(58) Field of Classification Search
CPC ............... H02M 1/36; H02M 3/33507; H02M 3/33546; H02M 2001/0003; H02M 2001/0025; H02M 2003/156; H02M 2003/158
See application file for complete search history.

(56) References Cited

U.S. PATENT DOCUMENTS

| | | | | |
|---|---|---|---|---|
| 5,828,558 A * | 10/1998 | Korcharz | .......... | H02M 3/33515 363/20 |
| 7,187,562 B2 * | 3/2007 | Stojcic | .......... | H02J 1/08 363/17 |
| 8,508,196 B2 * | 8/2013 | Deguchi | .......... | H02M 1/36 323/238 |
| 2012/0176819 A1 * | 7/2012 | Gao | .......... | H02M 1/36 363/21.12 |
| 2013/0056847 A1 * | 3/2013 | Chen | .......... | H01L 28/10 257/531 |
| 2014/0111128 A1 * | 4/2014 | Hensel | .......... | H02P 3/18 318/400.21 |
| 2016/0105094 A1 * | 4/2016 | Tang | .......... | H02M 3/33576 363/21.01 |

OTHER PUBLICATIONS

Sreekumar, C., et al., "A Hybrid Control Algorithm for Voltage Regulation in DC-DC Boost Converter", IEEE Transactions on Industrial Electronics, vol. 55, No. 6, (Jun. 2008), 2530-2538.

* cited by examiner

*Primary Examiner* — Matthew Nguyen
(74) *Attorney, Agent, or Firm* — Schwegman Lundberg & Woessner, P.A.

(57) ABSTRACT

Apparatus and methods are provided for starting up an isolated power converter. In an example, an integrated circuit for controlling an isolated power converter can include a control circuit configured to control a duty cycle of a primary switch according to an startup schedule during an initial interval of a start-up period of the isolated power supply, and to switch to a closed-loop control mode of the primary switch during a second interval of the start-up period after a voltage level of the DC output power signal is above a start-up threshold.

25 Claims, 2 Drawing Sheets

HYBRID SOFT-START FOR ISOLATED CONVERTER

BACKGROUND

Traditional power supply controllers for isolated systems utilize a primary side switch to induce a voltage on a secondary side of the controller. Electrical isolation and power transfer from the primary side to the secondary side can be accomplished, for example, with magnetic coupling via a transformer, with capacitive coupling via capacitor network, or combinations thereof. During steady state operation, feedback can be provided to control the switching element and provide the desired voltage and current at the output of the secondary side of the converter. For primary side controllers of an isolated converter, the feedback can include an isolation element, such as, but not limited to, an optical coupler. In certain control schemes, accommodations for unpredictable start-up conditions can add to the cost and complexity of the converter.

OVERVIEW

Apparatus and methods are provided for starting up an isolated power converter. In an example, an integrated circuit for controlling an isolated power converter can include a control circuit configured to control a duty cycle of a primary switch, or primary side switch, according to an startup schedule during an initial interval of a start-up period of the isolated power supply, and to switch to a closed-loop control mode of the primary switch during a second interval of the start-up period after a voltage level of the DC output power signal is above a start-up threshold.

This overview is intended to provide an overview of subject matter of the present patent application. It is not intended to provide an exclusive or exhaustive explanation of the present subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Two common control topologies can be classified as Pulse Width Modulated (PWM) and resonant frequency topologies. PWM topologies typically use an adjustable duty cycle as the control variable. Resonant frequency control of an isolated converter typically uses frequency as the control variable to deliver power at a desired voltage and current. Voltage mode control and current mode control are typical control strategies employed to allow the isolated converter to maintain a desired voltage output. Under voltage mode control, voltage feedback from the secondary side is used to control the duty cycle of the primary switch. Under current mode control, a primary side current limit can be adjusted based on voltage error feedback from the secondary side of the converter. The current limit can set the duty cycle of the primary switch. In general, current mode control systems provide benefits such as line rejection, simplified error compensation, and better response to changing load conditions. Current mode control does suffer from sub-harmonic oscillations for duty cycles >50%. In some examples, slope compensation, such as a slope compensation resistor can be used to the attenuate the sub-harmonic oscillations. In some examples, internal circuitry of the isolated converter controller can be used to provide slope compensation.

During startup of an isolated converter using a current mode control strategy, several factors can make control of the converter difficult. For example, during startup, the output voltage of the secondary side may not rise in a predetermined time period. During such a startup period, use of feedback can be futile and unstable. In addition, where current demand for the isolated converter is low during the start-up period, the output voltage can rise quite quickly and can drastically overshoot the desired output voltage. Accommodations to withstand these startup conditions can add cost and complexity to the isolated converter.

The present inventor has recognized a hybrid soft start strategy for an isolated converter that allows the converter to quickly provide secondary side voltage without overshoot and to subsequently provide fast response to changing load or input voltage conditions compared to a converter using a voltage control strategy. Although not limited as such, the present subject matter is well suited to isolated converters using an isolated control integrated circuit die that can electrically couple to elements on both the primary side and the secondary side of the isolated converter yet still provide electrical isolation between the primary side and the secondary side of the converter.

Figure 1:
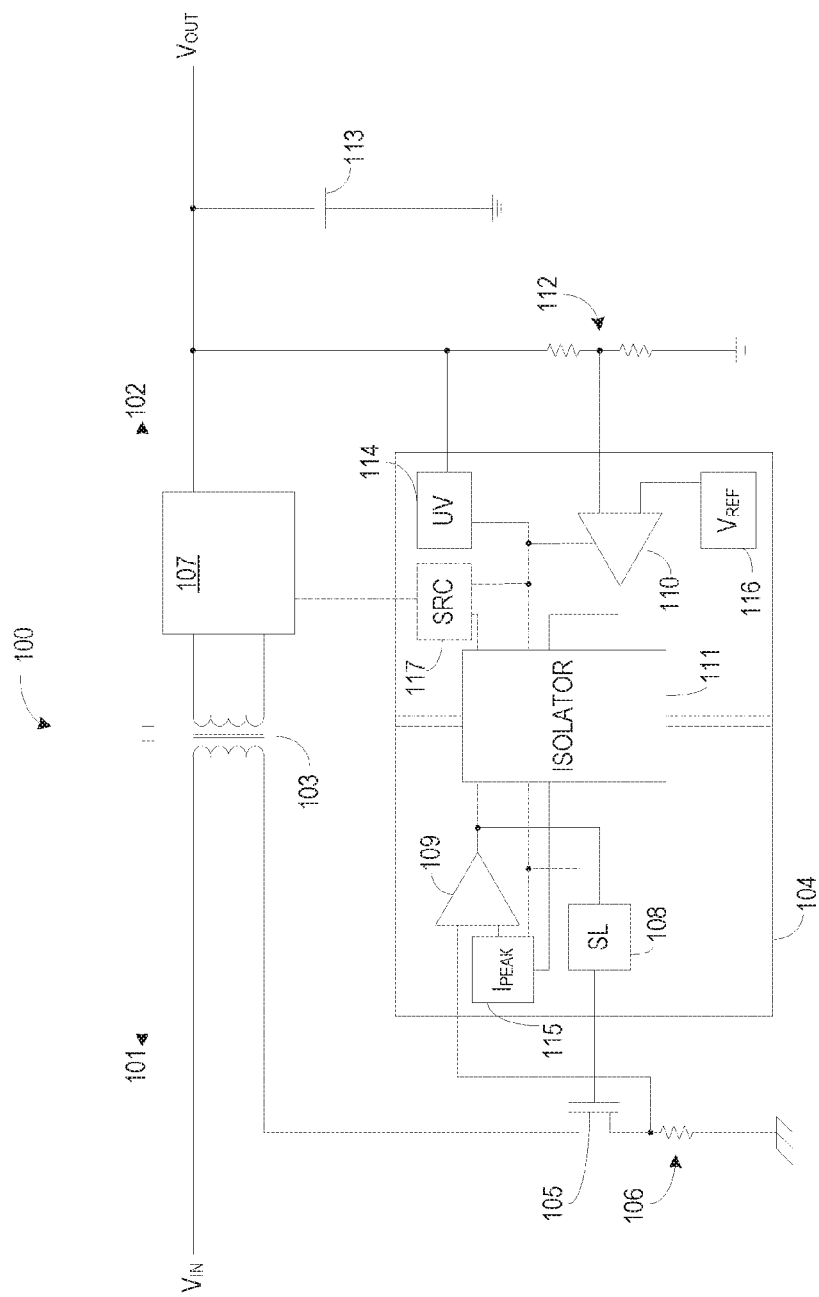
FIG. 1 illustrates generally an isolated converter 100 according to an example of the present subject matter.

FIG. 1 illustrates generally an isolated converter 100 according to an example of the present subject matter. The isolated converter 100 can include a primary side 101, a secondary side 102, a power isolator 103, and a controller 104. The primary side 101 can include a primary side switch 105. For simplicity, FIG. 1 shows a single primary side switch 105. The present subject matter is not limited as such. In certain examples, a hybrid soft-start as discussed herein can also be applied to power topologies that include, but are not limited to, half bridge PWM, full bridge PWM, flyback PWM, forward PWM, Half bridge LLC resonant and full bridge LLC resonant topologies. In certain examples, the primary side 101 can include an optional current detector 106. The primary side 101 can receive a voltage input ($V_{IN}$) and the primary side switch 105, via an output of the controller 104, can periodically establish and interrupt an electrical circuit including the voltage input ($V_{IN}$) and the isolator 103. For a transformer power isolator 103, the switching of the primary side switch 105 can transfer power from the primary side 101 to the secondary side 102 of the isolator 103 using magnetic coupling. For a capacitive power isolator (not shown), the primary side switch 105 can work in conjunction with a secondary side switch to transfer charge from the primary side 101 to the secondary side 102. In certain examples, the secondary side 102 can include rectifiers and filters 107 to receive an oscillating power signal induced by the switching of the primary side switch 105 and to provide a desired direct current (DC) voltage at the output of the isolated converter 100.

In certain examples, the controller 104, or control circuit, can control the state of the primary side switch 105 and can operate in one of several control modes. In certain examples, the controller 104 can include switching logic 108, a control comparator 109, an error amplifier 110 and a control isolator 111. The switching logic 108, or switching circuit, can include a pulse width modulated (PWM) switching circuit in some examples. The switching logic 108, or switching circuit, can control the primary side switch 105 via an output of the controller 104. The control comparator 109 can be coupled to the current detector 106 and can receive a representation of the current of the primary side of the isolator 103. The control comparator 109 can simultaneously receive an error signal and can provide a control signal for the switching logic 108. The error amplifier 110 can receive a voltage reference ($V_{REF}$) indicative of a desired output voltage of the isolated converter 100 and a feedback signal representative of the actual output voltage ($V_{OUT}$) of the isolated converter 100, and can provide an error signal indicative of the difference between the desired output voltage and the actual output voltage ($V_{OUT}$) to the control comparator 109. In some examples, the error amplifier 110 can be compensated by adding gain at different frequencies, for example, via an resistor-capacitor (RC) network (not shown). In certain examples, the voltage reference ($V_{REF}$) can be provided by a reference voltage generator 116 of the controller 104. The control isolator 111 can provide electrical isolation between the primary terminations of the controller 104 and the secondary terminations of the controller 104 while communicating control information across the isolation barrier. As illustrated in FIG. 1, the control isolator 111 can allow the compensated error signal of the error amplifier 110 coupled to a voltage feedback circuit 112 of the secondary side 102 of the isolated converter 100 to be passed to the control comparator 109 coupled to, for example, a current detector 106 of the primary side 101 of the isolated converter 100. In certain PWM examples, the control comparator 109 can be referred to as a current limit comparator while in the current mode control. In some examples, the control isolator 111 can include one or more magnetically coupled isolators. In some examples, the control isolator 111 can include a high-frequency transformer such as a high frequency air-core transformer. In some examples, the control isolator 111 can include a capacitor utilizing capacitively coupled techniques. In some examples, the control isolator 111 can include one or more optical isolators.

In certain examples, upon startup of the isolated converter 100, the switching logic 108 can operate in an open-loop mode and then switch to a closed-loop current mode as the actual output voltage ($V_{OUT}$) rises to power circuit elements of the secondary side 102. For isolated converters using full current mode control, starting in an open-loop current mode can present issues. Such a start-up mode can sweep a current limit from near zero and can progressively increase the current limit. However, in order to begin building voltage at the output of the isolated converter 100, the available current, and by extension, the current limit, needs to be higher than the load current such that charge can begin to build on the output capacitor 113. Thus, an open-loop current limit start-up approach can cause significant delay in building actual output voltage ($V_{OUT}$) when the load is relatively high. When the load is relatively light, the open-loop current limit start-up approach can easily build voltage very quickly and the actual output voltage ($V_{OUT}$) can overshoot a desired or rated output voltage of the isolated converter 100. Accommodating such overshoot can increase the cost and complexity of the isolated converter. Failure to compensate for such overshoot can shorten the useable lifetime of the isolated converter.

As alluded to above, the present inventor has recognized a hybrid start-up approach for an isolated converter. In certain examples, the switching logic 108 starts up in an open-loop voltage mode and then switches to a closed-loop current mode. The hybrid start-up approach allows the actual output voltage ($V_{OUT}$) of the isolated converter to immediately begin to ramp up as there is little if any current limit on the open-loop voltage control. In certain examples, the gradual ramp of the open-loop start up is targeted and control can change from open-loop voltage mode control to closed-loop current mode control after a predetermined interval. For isolated converters having a fixed switching frequency, the open-loop voltage control can progress by gradually increasing the duty cycle or on-time of the primary side switch 105 to begin to ramp the output voltage ($V_{OUT}$) of the isolated converter 100 up to the desired output voltage. For isolated converters having a resonant control topology, the open-loop voltage mode control can progress by holding the switching frequency steady and increasing the duty cycle or on-time of the primary side switch 105 to begin to ramp the output voltage ($V_{OUT}$) up to the desired output voltage. In some examples, the hybrid soft-start of a resonant topology converter can progress by keeping the switching frequency fixed and ramping the duty cycle from 0 to 50%. At a certain point, say 10% duty cycle for example, the output voltage ($V_{OUT}$) can be greater than a lock-out threshold (discussed below) and the secondary side of the converter can be allowed to power up. After the secondary side of the converter starts up, and about the time the open-loop duty cycle of the primary side switch 105 reaches 50%, the fixed frequency is transmitted from the primary side to secondary side using the isolator 111 and the error amplifier 110 can begin to provide a frequency error information that can directly control the switching logic 108. In such an example, the isolated converter 100 may not include the control comparator 109 or the peak detector 115. Thus, the hybrid soft-start can allow the power converter 100 to utilize benefits of both voltage mode control, during initial startup, and closed-loop control, during the remainder of the startup and steady state power delivery. In certain examples, a hybrid soft-start according to the present subject matter can ease timing constraints associated with handover circuitry that allows the controller 104 to operate in closed-loop mode from the secondary side 102.

In some examples, the isolated converter controller 104 can include an under-voltage lock-out (UVLO) circuit 114. The UVLO circuit 114 can provide a default lock-out signal when the isolated converter 100 is powered down or the actual output voltage ($V_{OUT}$) is below a lock-out threshold. Upon start-up, as the output voltage ($V_{OUT}$) of the isolated converter 100 begins to rise, the UVLO signal can change states when the isolated output voltage ($V_{OUT}$) satisfies the lock-out threshold. In certain examples, the UVLO signal can enable or affect certain circuits that rely on the actual output voltage ($V_{OUT}$) for power or mode control, including, for example, but not limited to, the isolator 111, the error amplifier 110, a synchronous rectifier controller 117, the peak current memory circuit 115, the switching logic 108 or combinations thereof. In some examples, the UVLO signal can optionally be used by the switching logic 108 to change over from the open-loop start-up voltage mode to the closed-loop current mode. In certain examples, the lock-out threshold can be significantly different than the desired output voltage such that the closed-loop control mode can be enabled well before the actual output voltage ($V_{OUT}$) has ramped to the desired output voltage level.

In certain examples, the controller 104 can include a memory circuit ($I_{PEAK}$) 115 or a sample and hold circuit for storing the peak primary current during the open-loop voltage start-up mode. For isolated power converters having a fixed switching frequency, upon changing over to closed-loop current control, the controller 104 via the memory circuit 115 can provide an initial current limit to the control comparator 109 and the handover of control from open-loop voltage to closed-loop current can transpire seamlessly. Upon completing the first closed loop switching cycle with the initial current limit, the feedback loop can be used to provide subsequent current limit values to the current comparator.

In certain examples, the controller 104 can include a memory circuit or a sample and hold circuit for storing the last duty cycle during the open-loop voltage start-up mode. For isolated power converters having a resonant control topology, upon changing over to closed-loop current control, the controller, via the memory circuit, can provide an initial frequency based on a duration of the last duty cycle to the current comparator and the handover of control from open-loop voltage to closed-loop current can transpire seamlessly. Upon completing the first closed loop switching cycle with the initial frequency, the feedback loop can be used to provide subsequent frequency values to either the switching logic 108 or the control comparator 109.

In certain examples, an isolated converter 100 employing a hybrid startup as discussed above can provide immediate buildup of voltage on the output capacitor 113 regardless of load current value, can eliminate timing issues related to transitioning to closed-loop current control at start-up, and can avoid output voltage overshoot, especially for low output voltages, without additional start-up circuitry.

In some isolated converters, the filters and rectifiers 107 can optionally include synchronous rectifiers. Switching information, such as the information provided by the control comparator 109, can be used by an optional synchronous rectifier controller (SRC) 117 to control the synchronous rectifiers through another isolator like 111 in some examples. In certain examples, the information provided by the control comparator 109 can be communicated across the isolation barrier of the controller using an additional isolator.

Figure 2:
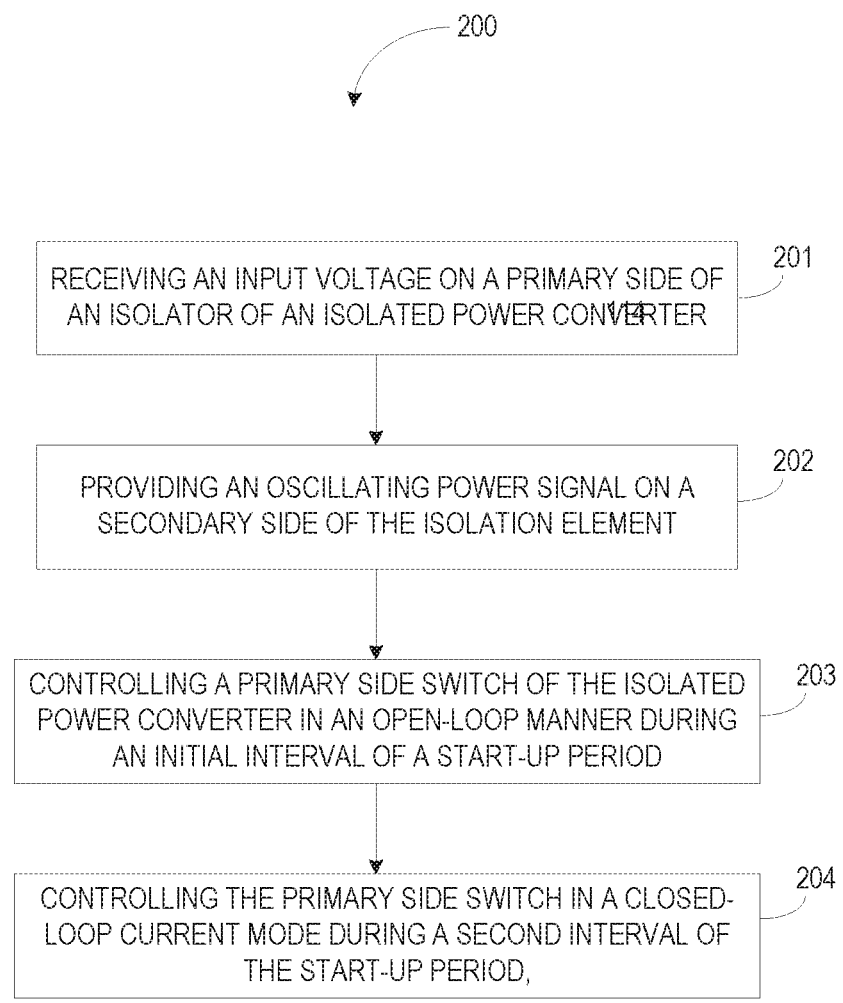
FIG. 2 illustrate generally a flowchart of a method for startup for an isolated power converter according to an example of the present subject matter.

FIG. 2 illustrate generally a flowchart of a method for startup for an isolated power converter according to an example of the present subject matter. At 201, an input voltage can be received on the primary side of an isolator of an isolated power converter. At 202, an oscillating power signal can be provided on a secondary side of the isolator. In certain examples, the oscillating power signal can be induced using a primary side switch configured to periodically establish, or complete, a circuit and to interrupt the circuit including a primary side of the isolator and the input voltage. At 203, the primary side switch can be controlled in an open-loop voltage mode during an initial interval of a start-up period. The initial period of the start-up interval can begin when input voltage is first received at the primary side of the isolator. At 204, the primary side switch can be controlled in a closed-loop current mode during a second interval of a start-up period. In certain examples, the second interval of the start-up period can start up immediately following the initial interval of the startup period.

VARIOUS NOTES & EXAMPLES

In Example 1, a power converter can include an electrical isolator having a primary side and a secondary side that is electrically isolated from current from the primary side, the isolator configured to receive an input voltage on the primary side and to provide an oscillating power signal on the secondary side, a primary switch, configured to complete a primary side circuit in a first state and to interrupt the primary side circuit in a second state, the primary side circuit including the primary side of the isolator, a secondary circuit configured to receive the oscillating power signal and to provide a direct current (DC) output power signal, and a control circuit configured to control a duty cycle of the primary switch according to an open-loop duty cycle during a first interval of a start-up period of the isolated power converter, and to switch to a closed-loop control mode of the primary switch during a second interval of the start-up period after a voltage level of the DC output power signal is determined to be above a start-up threshold value.

In Example 2, the control circuit of Example 1 optionally includes a first comparator. The first comparator can include a first input to receive a representation of a voltage level of the DC output power signal, a second input to receive a representation of the start-up threshold value, wherein the comparator is configured to compare the representation of the voltage level to the start-up threshold, and to switch control from the open-loop duty cycle to the closed loop control mode when the representation of a voltage level of the DC output power signal satisfies the start-up threshold value.

In Example 3, the open-loop duty cycle of any one or more of Examples 1-2 optionally is configured to gradually increase an on-time of the primary switch during the first interval.

In Example 4, the control circuit of any one or more of Examples 1-3 optionally includes a peak current detector circuit configured to receive a representation of current in the primary side of the isolator during the first interval of the start-up period and to store a peak current value indicative of a peak current of the primary side of the isolator during the on-time of the primary switch.

In Example 5, the control circuit of any one or more of Examples 1-4 optionally includes an error amplifier circuit. The error amplifier can include a first input to receive a representation of a voltage level of the DC output power signal, a second input to receive a representation of a second threshold, and an output to provide a current limit threshold based on a comparison of the representation of the voltage level of the DC output power signal and the second threshold.

In Example 6, the control circuit of any one or more of Examples 1-5 optionally includes a control comparator or current limit comparator circuit. The current limit comparator can include a first input to receive a representation of current passing through the primary switch and a second input to receive the peak current value. The comparator circuit can be configured to, during at least a first switching cycle of the closed loop current mode control provide a current limit signal based on a comparison of the representation of current passing through the primary switch and the peak current value.

In Example 7, after the at least first switching cycle of the closed loop control mode, the current limit comparator of any one or more of Examples 1-7 optionally is configured to receive the representation of current passing through the primary switch at the first input, to receive the current limit threshold at the second input, and to provide the current limit signal based on a comparison of the representation of current passing through the primary switch and the current limit threshold.

In Example 8, wherein the control circuit of any one or more of Examples 1-7 optionally includes a switching circuit. The switching circuit can be configured to drive a control terminal of the primary switch, to control a switching frequency of the primary switch and a duty cycle of the primary switch, and to receive the current limit signal and to adjust duty cycle of the primary switch based on the current limit signal.

In Example 9, the switching circuit of any one or more of Examples 1-8 optionally is a pulse width modulated (PWM) switching circuit having a fixed switching frequency.

In Example 10, an integrated circuit die optionally includes the control circuit of any one or more of Examples 1-9 and the integrated circuit die can include an air-core based isolator for communicating information, and maintaining isolation, between primary side circuit elements of the integrated circuit die and the secondary side circuit elements of the integrated circuit die.

In Example 11, the primary side circuit elements of the integrated circuit die of any one or more of Examples 1-10 optionally include the current limit comparator and the secondary side circuit elements of any one or more of Examples 1-10 optionally include the error amplifier.

In Example 12, the control circuit of any one or more of Examples 1-11 optionally includes an error amplifier circuit. The error amplifier can include a first input to receive a representation of a voltage level of the DC output power signal, a second input to receive a representation of a second threshold, and an output to provide an error switching frequency based on a comparison of the representation of the voltage level of the DC output power signal and the second threshold.

In Example 13, the isolated power converter of any one or more of Examples 1-12 optionally includes a switching circuit configured to drive a control terminal of the primary switch and to control a frequency and a duty cycle of the primary switch, wherein the switching circuit is configured to receive the error switching frequency and to adjust the frequency of the primary switch based on the error switching frequency.

In Example 14, an integrated circuit die optionally includes the control circuit of any one or more of Examples 1-13. The integrated circuit die optionally includes an air-core based isolator for communicating information, and maintaining isolation, between primary side circuit elements of the integrated circuit die and the secondary side circuit elements of the integrated circuit die.

In Example 15, the primary side circuit elements of the integrated circuit die of any one or more of Examples 1-14 optionally include the switching circuit, and the secondary side circuit elements of any one or more of Examples 1-14 optionally include the error amplifier.

In Example 16, an integrated circuit for controlling an isolated power converter can include a control circuit configured to control a duty cycle of a primary switch according to an open-loop duty cycle schedule during an initial interval of a start-up period of the isolated power supply, and to switch to a closed-loop control mode of the primary switch during a second interval of the start-up period after a voltage level of a DC output power signal is above a start-up threshold. The isolated power converter can include a primary side configured to receive an input voltage and a secondary side configured to provide a direct-current (DC) supply voltage, the primary side and the secondary side electrically isolated from each other.

In Example 17, the control circuit of any one or more of Examples 1-16 optionally includes an error amplifier. The error amplifier can include a first input to receive a representation of a voltage level of the DC output power signal, a second input to receive a representation of a second threshold and an output to provide an error signal based on a comparison of the representation of the voltage level of the DC output power signal and the second threshold.

In Example 18, the control circuit of any one or more of Examples 1-14 optionally includes a current detector configured to store a peak current value of the primary switch during the initial interval of a start-up period and a current limit comparator. The current limit comparator can include a first input to receive a representation of current passing through the primary switch and a second input to receive an isolated version of the error signal. The current limit comparator can be configured to, during at least a first switching cycle of the closed loop control mode provide a current limit signal based on a comparison of the representation of current passing through the primary switch and the peak current value.

In Example 19, after the at least first switching cycle of the closed loop control mode control, the current limit comparator of any one or more of Examples 1-18 optionally is configured to receive the representation of current passing through the primary switch at the first input, to receive the error signal at the second input and to provide the current limit signal based on a comparison of the representation of current passing through the primary switch and the error signal.

In Example 20, the control circuit of any one or more of Examples 1-19 optionally includes switching logic. The switching logic can be configured to drive a control terminal of the primary switch, to control a switching frequency and a duty cycle of the primary switch, to receive the current limit signal and to adjust the duty cycle of the primary switch based on the current limit signal.

In Example 21, the control circuit of any one or more of Examples 1-20 optionally includes switching logic. The switching logic can be configured to drive a control terminal of the primary switch, to control a switching frequency and a duty cycle of the primary switch, to receive the error signal and to adjust the frequency of the primary switch based on the current limit signal.

In example 22, when the open loop duty cycle approaches 50%, the switching frequency of the primary switch of any one or more of Examples 1-21 optionally is passed to the error amplifier and the error amplifier can provide an initial closed loop output equal to the switching frequency.

In Example 23, a method of soft-starting an isolated power converter can include receiving an input voltage on a primary side of an isolation element of the isolated power converter, providing an oscillating power signal on the secondary side of the isolation element, receiving the oscillating power signal at a secondary side circuit of the isolated power converter, providing a direct current (DC) output power signal at an output of the secondary side circuit, controlling a primary side switch of the isolated power converter in an open-loop mode during an initial interval of a start-up period of the isolated power converter, the primary side switch electrically coupled with the primary side of the isolation element of the isolated power converter, and controlling the primary side switch in a closed-loop mode during a second interval of the start-up period, the second interval immediately subsequent to the initial interval.

Example 24 can include, or can optionally be combined with any portion or combination of any portions of any one or more of Examples 1 through 23 to include, subject matter that can include means for performing any one or more of the functions of Examples 1 through 23, or a machine-readable medium including instructions that, when performed by a machine, cause the machine to perform any one or more of the functions of Examples 1 through 23.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 CFR, §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A power converter comprising:
   an electrical isolator having a primary side and a secondary side that is electrically isolated from current from the primary side, the isolator configured to receive an input voltage on the primary side and to provide an oscillating power signal on the secondary side;
   a primary switch, configured to complete a primary side circuit in a first state and to interrupt the primary side circuit in a second state, the primary side circuit including the primary side of the isolator;
   a secondary circuit configured to receive the oscillating power signal and to provide a direct current (DC) output power signal;
   a control circuit configured to control a duty cycle of the primary switch according to an open-loop duty cycle during a first interval of a start-up period of the isolated power converter, and to switch to a closed-loop control mode of the primary switch during a second interval of the start-up period after a voltage level of the DC output power signal is determined to be above a start-up threshold value; and
   wherein the control circuit includes a peak current detector circuit configured to receive a representation of current in the primary side of the isolator during the first interval of the start-up period and to store in memo a last duty cycle indicative of a peak current of the primary side of the isolator during the on-time of the primary switch.

2. The power converter of claim 1, wherein the control circuit includes a first comparator, the first comparator including:
   a first input to receive a representation of a voltage level of the DC output power signal; and
   a second input to receive a representation of the start-up threshold value;
   wherein the comparator is configured to compare the representation of the voltage level to the start-up threshold, and to switch control from the open-loop duty cycle to the closed loop control mode when the representation of a voltage level of the DC output power signal satisfies the start-up threshold value.

3. The power converter of claim 1, wherein the open-loop duty cycle is configured to gradually increase an on-time of the primary switch during the first interval.

4. The power converter of claim 1, wherein the control circuit includes an error amplifier circuit, the error amplifier including:
   a first input to receive a representation of a voltage level of the DC output power signal;

a second input to receive a representation of a second threshold; and an output to provide a current limit threshold based on a comparison of the representation of the voltage level of the DC output power signal and the second threshold.

5. The power converter of claim 4, wherein the control circuit includes a current limit comparator circuit, including;
   a first input to receive a representation of current passing through the primary switch;
   a second input to receive the last duty cycle; and
   wherein the comparator circuit is configured to, during at least a first switching cycle of the closed loop current mode control, provide a current limit signal based on a comparison of the representation of current passing through the primary switch and the last duty cycle.

6. The isolated power converter of claim 5, wherein, after the at least first switching cycle of the closed loop control mode, the current limit comparator is configured:
   to receive the representation of current passing through the primary switch at the first input;
   to receive the current limit threshold at the second input; and
   to provide the current limit signal based on a comparison of the representation of current passing through the primary switch and the current limit threshold.

7. The isolated power converter of claim 5, wherein the control circuit includes a switching circuit, the switching circuit configured to drive a control terminal of the primary switch and to control a switching frequency of the primary switch and a duty cycle of the primary switch; and
   wherein the switching circuit is configured to receive the current limit signal and to adjust duty cycle of the primary switch based on the current limit signal.

8. The isolated power converter of claim 7, wherein the switching circuit is a pulse width modulated (PWM) switching circuit having a fixed switching frequency.

9. The isolated power converter of claim 8, where an integrated circuit die includes the control circuit; and
   wherein the integrated circuit die includes an air-core based isolator for communicating information, and maintaining isolation, between primary side circuit elements of the integrated circuit die and the secondary side circuit elements of the integrated circuit die.

10. The isolated power converter of claim 9, wherein the primary side circuit elements of the integrated circuit die include the current limit comparator; and
    wherein the secondary side circuit elements include the error amplifier.

11. The isolated power converter of claim 3, wherein the control circuit includes an error amplifier circuit, the error amplifier including:
    a first input to receive a representation of a voltage level of the DC output power signal;
    a second input to receive a representation of a second threshold; and
    an output to provide an error switching frequency based on a comparison of the representation of the voltage level of the DC output power signal and the second threshold.

12. The isolated power converter of claim 11, including a switching circuit configured to drive a control terminal of the primary switch and to control a frequency and a duty cycle of the primary switch, wherein the switching circuit is configured to receive the error switching frequency and to adjust the frequency of the primary switch based on the error switching frequency.

13. The isolated power converter of claim 12, where an integrated circuit die includes the control circuit; and
    wherein the integrated circuit die includes an air-core based isolator for communicating information, and maintaining isolation, between primary side circuit elements of the integrated circuit die and the secondary side circuit elements of the integrated circuit die.

14. The isolated power converter of claim 13, wherein the primary side circuit elements of the integrated circuit die include the switching circuit; and
    wherein the secondary side circuit elements include the error amplifier.

15. An integrated circuit for controlling an isolated power converter, the isolated power converter having a primary side configured to receive an input voltage and a secondary side configured to provide a direct-current (DC) supply voltage, the primary side and the secondary side electrically isolated from each other, the integrated circuit comprising:
    a control circuit configured to control a duty cycle of the primary switch according to an open-loop duty cycle schedule during an initial interval of a start-up period of the isolated power supply, and to switch to a closed-loop control mode of the primary switch during a second interval of the start-up period after a voltage level of the DC supply voltage is above a start-up threshold, wherein the control circuit includes:
    an error amplifier configured to provide a comparison of a representation of a voltage level of the DC supply voltage and a second threshold and an error signal based on the comparison;
    a current detector configured to store a peak current value of the primary switch during the initial interval of a start-up period in a memory circuit;
    a current limit comparator, the current limit comparator including;
    a first input to receive a representation of current passing through the primary switch;
    a second input to receive an isolated version of the error signal; and
    wherein the current limit comparator is configured to, during at least a first switching cycle of the closed loop control mode provide a current limit signal based on a comparison of the representation of current passing through the primary switch and the peak current value.

16. The integrated circuit of claim 15, wherein the control circuit includes an error amplifier, the error amplifier including:
    a first input to receive a representation of a voltage level of the DC output power signal;
    a second input to receive a representation of a second threshold; and
    an output to provide an error signal based on a comparison of the representation of the voltage level of the DC output power signal and the second threshold.

17. The integrated circuit of claim 15, wherein, after the at least first switching cycle of the closed loop control mode control, the current limit comparator is configured:
    to receive the representation of current passing through the primary switch at the first input;
    to receive the error signal at the second input; and
    to provide the current limit signal based on a comparison of the representation of current passing through the primary switch and the error signal.

18. The integrated circuit of claim 17, wherein the control circuit includes switching logic, the switching logic configured to drive a control terminal of the primary switch and to control a switching frequency and a duty cycle of the primary switch; and wherein the switching logic is configured to receive the current lia it signal and to adjust the duty cycle of the primary switch based on the current limit signal.

19. The integrated circuit of claim 16, wherein the control circuit includes switching logic, the switching logic configured to drive a control terminal of the primary switch and to control a switching frequency and a duty cycle of the primary switch; and wherein the switching logic is configured to receive the error signal and to adjust the frequency of the primary switch based on the current limit signal.

20. The integrated circuit of claim 19, wherein, when the open-loop duty cycle approaches 50%, the switching frequency of the primary switch is passed to the error amplifier; and wherein the error amplifier provides an initial closed-loop output equal to the switching frequency.

21. A method of soft-starting an isolated power converter, the method comprising:

receiving an input voltage on a primary side of an isolation element of the isolated power converter;

providing an oscillating power signal on the secondary side of the isolation element;

receiving the oscillating power signal at a secondary side circuit of the isolated power converter;

providing a direct current (DC) output power signal at an output of the secondary side circuit;

controlling a primary side switch of the isolated power converter in an open-loop mode during an initial interval of a start-up period of the isolated power converter, the primary side switch electrically coupled with the primary side of the isolation element of the isolated power converter;

storing a last duty cycle of the primary switch during the initial interval of a start-up period in memory to provide a stored last duty cycle; and controlling the primary side switch in a closed-loop mode during a second interval of the start-up period, the second interval immediately subsequent to the initial interval, wherein the controlling the primary side switch in a closed-loop mode includes using the stored last duty cycle as an initial duty cycle of the closed loop mode.

22. The method of claim 21, including magnetically coupling the primary side of the isolation element with secondary side of the isolation element.

23. The method of claim 21, including capacitive coupling the primary side of the isolation element with the secondary side of the isolation element.

24. The power converter of claim 1, wherein the electrical isolator includes a transformer.

25. The power converter of claim 1, wherein the electrical isolator includes a capacitive network coupling the primary side and the secondary side.

* * * * *

UNITED STATES PATENT AND TRADEMARK OFFICE
CERTIFICATE OF CORRECTION

PATENT NO. : 9,960,669 B2
APPLICATION NO. : 15/075905
DATED : May 1, 2018
INVENTOR(S) : Subodh Prakash Madiwale It is certified that error appears in the above-identified patent and that said Letters Patent is hereby corrected as shown below:

In the Claims

In Column 10, Line 43, in Claim 1, delete "memo" and insert --memory-- therefor

In Column 13, Line 5, in Claim 18, delete "lia it" and insert --limit-- therefor Signed and Sealed this
Eleventh Day of June, 2019

Andrei Iancu
*Director of the United States Patent and Trademark Office*